(12) United States Patent
Wiseman

(10) Patent No.: US 7,725,477 B2
(45) Date of Patent: May 25, 2010

(54) POWER FILTER FOR ONLINE LISTING SERVICE

(75) Inventor: Garry R. Wiseman, Snoqualmie, WA (US)

(73) Assignee: Microsoft Corporation, Redmond, WA (US)

( * ) Notice: Subject to any disclaimer, the term of this patent is extended or adjusted under 35 U.S.C. 154(b) by 334 days.

(21) Appl. No.: 11/311,813

(22) Filed: Dec. 19, 2005

(65) Prior Publication Data

US 2007/0143312 A1 Jun. 21, 2007

(51) Int. Cl.
*G06F 7/00* (2006.01)
(52) U.S. Cl. .................... 707/758; 715/200; 715/733
(58) Field of Classification Search .................. None
See application file for complete search history.

(56) References Cited

U.S. PATENT DOCUMENTS

| | | | | | |
|---|---|---|---|---|---|
| 5,561,799 | A | * | 10/1996 | Khalidi et al. | 707/200 |
| 6,134,548 | A | * | 10/2000 | Gottsman et al. | 707/5 |
| 6,816,850 | B2 | * | 11/2004 | Culliss | 707/1 |
| 2002/0054139 | A1 | * | 5/2002 | Corboy et al. | 709/218 |
| 2002/0055924 | A1 | | 5/2002 | Liming | |
| 2004/0139049 | A1 | * | 7/2004 | Hancock et al. | 707/1 |
| 2004/0210602 | A1 | * | 10/2004 | Hillis et al. | 707/104.1 |
| 2004/0267691 | A1 | * | 12/2004 | Vasudeva | 707/1 |
| 2005/0004889 | A1 | * | 1/2005 | Bailey et al. | 707/1 |
| 2005/0027666 | A1 | * | 2/2005 | Beck et al. | 707/1 |
| 2006/0112123 | A1 | * | 5/2006 | Clark et al. | 707/101 |
| 2006/0149606 | A1 | * | 7/2006 | Goan et al. | 705/7 |
| 2008/0005064 | A1 | | 1/2008 | Sarukkai | |

OTHER PUBLICATIONS

Office Action dated June 22, 2009 for U.S. Appl. No. 11/301,402.

* cited by examiner

*Primary Examiner*—Cheyne D Ly
*Assistant Examiner*—Jau-Shya Meng
(74) *Attorney, Agent, or Firm*—Shook, Hardy & Bacon L.L.P.

(57) ABSTRACT

A unique system and method that facilitates searching an online listing service by employing a plurality of attributes, parameters, and search terms in a search query is provided. The system and method involve using parameters such as the listed item's location and a trust category associated with the listed item to assist in providing more meaningful listings in response to the search query. These parameters can be applied to one or more search queries or can be modified for each search query. Categories, subcategories, and attributes can also be used to optimize the searching capability of the system and method. In particular, the set of available attributes displayed to a user can depend on the particular category and/or subcategory. Listing owners can manage their listings and increase traffic and/or revenue using such filtering and viewing modes.

18 Claims, 12 Drawing Sheets

FIG. 6

POWER FILTER FOR ONLINE LISTING SERVICE

BACKGROUND

The World Wide Web ("Web") has evolved into an infinitely large virtual metropolis where a person can find just about anything from general information regarding people, places and things to real and commercial property offered for sale. For example, information on nearly anything and everything is offered on the Web for free or for a fee. Virtual communities are prevalent and buying and selling merchandise and services via the Internet has become a more widely accepted practice and way of doing business within the last handful of years.

Aside from established merchants and commercial retailers, individuals have found a marketplace online for shopping or peddling their new or used merchandise as well as seeking or offering a variety of services. Many employers seeking employees and those seeking employment have turned to the Internet for opportunities; and finding your future spouse or others with similar interests is a viable trend in recent years as well. Generally speaking, this marketplace can be referred to as an online listing service and some websites specializing in this type of commerce currently exist. Most notably, EBay and Craig's List are two of the more popular sites.

EBay is a national site for buyers and sellers across the country. However, national sites including EBay lack the level of personalization that may be more closely associated with some of the more parochial sites such as Craig's List. EBay has traditionally focused on the ability to hold auctions across the country while Craig's List has currently adopted a message board type of framework that is purely local based. Either one may offer apparent advantages over the other, but both appear to be deficient in providing users with a comprehensive and efficient marketplace. In addition, the national site can be too large-scale and intimidating for new or infrequent users. To the other extreme, the more local based site may seem too restricted in terms of the scope available items and ability to attract buyers and sellers across regions.

SUMMARY

The following presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

The subject application relates to a system(s) and/or methodology that provide various filtering and searching capabilities to enhance a user's experience and interaction with an online listing service. Traditional online classified sites provide limited search capabilities and often rely primarily on free-text searches. Thus, searching for desired items can be cumbersome and inefficient. The system and methods described herein provide a more powerful searching mechanism for buyers as well as an improved means for managing listings. In particular, a large variety of attributes can be maintained for each listed item in each relevant category. Suggestions can dynamically be made to the user as a search query is entered so that very specific queries can be formulated to fulfill the user's desired search. By providing suggestions, the search can be performed in a more focused manner rather than having to search across all categories. In addition, the system can recall previous search queries and alert users to new items of potential interest based on such previous searches or purchases.

In practice for instance, one or more filters can be used and/or combined to hone in on the user's desired item. For example, the user can search based on the item itself as well as the item's location, delivery mode, price, trusted seller, social group, features, etc. In addition, the user can view the location(s) of the item as well as filter the view of the item based on any number of selected attributes that may relate to the location of the item, the owner of the item, or the item itself. For instance, the user can select to view only listings located within a t-mile radius from the user's location (e.g., home address). In addition, the system can also incorporate other online communities to extend or limit a user's search to specific communities or users. By incorporating these other communities/networks, the number of potential buyers, for example, can increase. Furthermore, users may feel more at ease when dealing with others who belong to the same online communities or groups. For example, communications such as questions can be sent via trusted and familiar messaging services to facilitate mitigating spam and phishing concerns.

Listing owners can also make use of these filter capabilities to facilitate maintaining and managing their listings (e.g., inventory). Inventory can be viewed or managed based on user interest, length of posting versus cost of posting (e.g., should the seller discount the price to avoid paying additional posting fee—for premium listings). Furthermore, sellers, for example, can filter the users who have bid or shown interest or purchased from the seller based on location, social group, trust level, etc. and provide additional incentives or new item alerts based on any of the above.

To the accomplishment of the foregoing and related ends, certain illustrative aspects of the invention are described herein in connection with the following description and the annexed drawings. These aspects are indicative, however, of but a few of the various ways in which the principles of the invention may be employed and the subject invention is intended to include all such aspects and their equivalents. Other advantages and novel features of the invention may become apparent from the following detailed description of the invention when considered in conjunction with the drawings.

BRIEF DESCRIPTION OF THE DRAWINGS

FIG. 6 is an exemplary user interface of a search view screen that allows a user to set a plurality of search parameters or attributes to obtain and display the desired search results.

DETAILED DESCRIPTION

Figure 1:
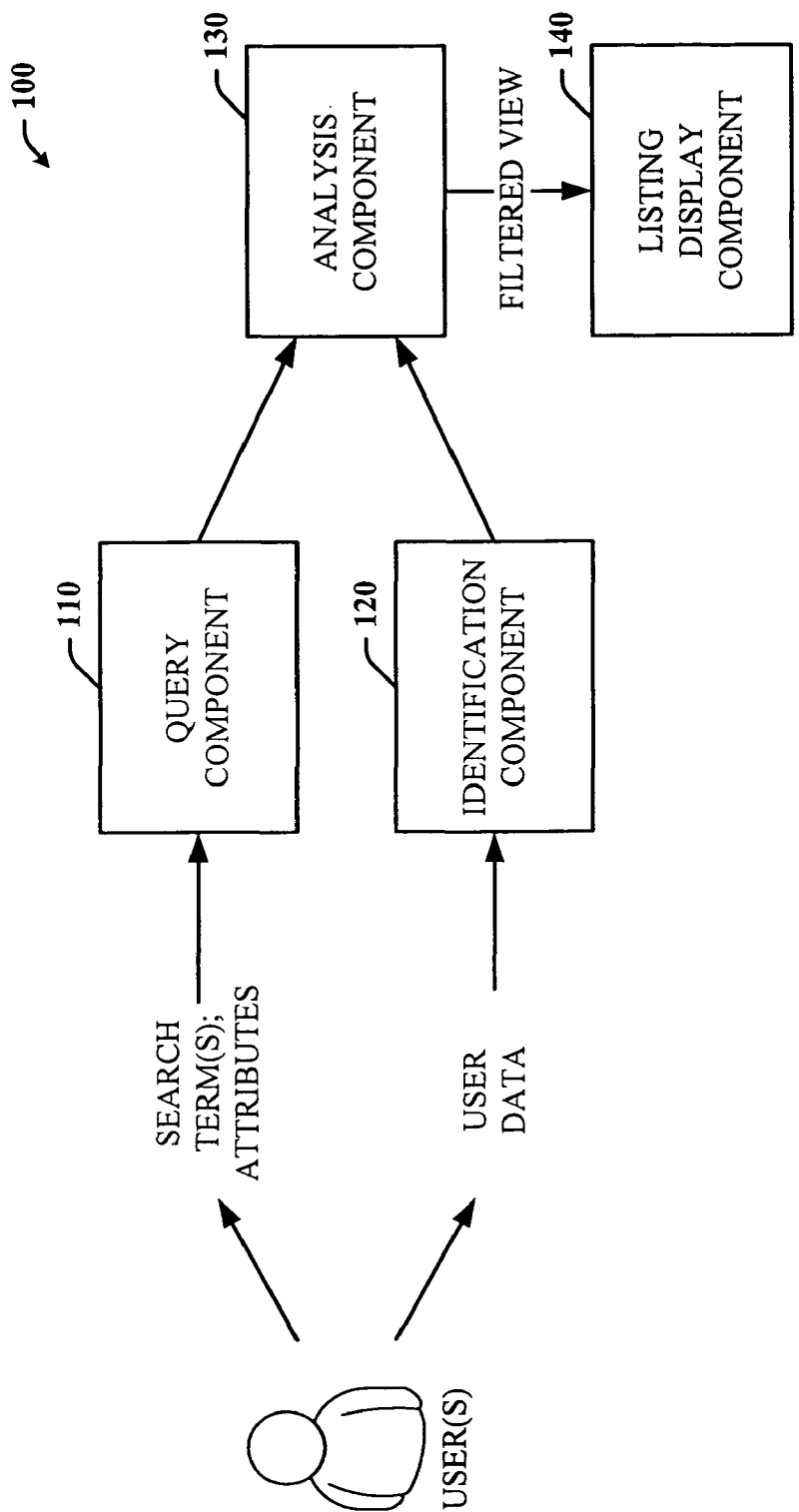
FIG. 1 is a block diagram of a filtering system for a listing service that facilitates searching for and displaying items based on at least one of the user and one or more attributes selected by the user.

The subject systems and/or methods are now described with reference to the drawings, wherein like reference numerals are used to refer to like elements throughout. In the following description, for purposes of explanation, numerous specific details are set forth in order to provide a thorough understanding of the systems and/or methods. It may be evident, however, that the subject systems and/or methods may be practiced without these specific details. In other instances, well-known structures and devices are shown in block diagram form in order to facilitate describing them.

As used herein, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers.

The subject systems and/or methods can incorporate various inference schemes and/or techniques in connection with setting one or more attributes automatically based in part on historical user input. For example, when a user initiates a search request for a particular item, one or more attributes can be automatically determined based on the user's previous attribute selection based on the type of search request entered. Inference schemes can also be employed to facilitate the management of inventory available for sale or otherwise via the listing service. Sellers, for example, can employ trained filters to manage and regulate the distribution or location of inventory based on user demand, the location of the demand and other parameters in order to optimize their sales.

As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

The systems and methods described herein provide for dynamically looking at key search terms and presenting inferred related items in connection with an online listing service. For example, performing a search on waterfront properties would result in a list of house listings having one or more attributes selected by the user. The one or more attributes can be pre-filled based on previous user selections or preferences or can be filled in by the user at the time of the search. The attributes can vary depending on the type of item or category of items desired. In addition to searching for a particular item by name, items can also be searched according to their geographic location. When listed with the listing service, an item can be geo-tagged. A geo-tag refers to a geographic reference such as an address, city, state, region or a latitude-longitude set of coordinates, for example. The geo-tag along with one or more other available search attributes or parameters allows the listing service to converge on a subset of results associated with a search. In addition, the listing service and system related thereto can provide directions or different views to the item. For instance, a bird's eye view of a posted garage sale event can be obtained by employing one or more mapping systems.

Referring now to FIG. 1, there is a general block diagram of a filtering system 100 for a listing service that facilitates searching for and displaying items based on at least one of the user and one or more attributes selected by the user. The system 100 includes a query component 110 that receives a user's search request. The request can include one or more search terms entered by the user. The request may also include any number of attributes or parameters to facilitate retrieving the most relevant listings for the particular search request.

In addition, the system 100 can include an identification component 120 that receives input from the user regarding his/her identity. More specifically, the identity of the user may affect or influence which listings are retrieved or displayed to the user or which listings can be searched. For example, the user may be a member of several online communities such as for work, school, and a cooking club. The user may only want to view listings posted by members of any of these three communities. Thus, the user's identity is pertinent to fulfill or satisfy this request. Similarly, some listings may require that only particular community members can view them. So again, the user's identity can be useful in order to retrieve any of these "semi-private" listings.

An analysis component 130 can receive the user's search request as well as the user's identity information and examine it to determine the most appropriate and relevant listings to return. In particular, the analysis component 130 essentially parses the search request terms and/or user information and filters the plurality of listings to converge on a set of items that satisfy the user's search parameters. The parameters may be applied in a particular order and thus given specific weights corresponding to the importance of the parameter and/or the order of the parameter with respect to the other parameters. Once the listings are determined, they can be communicated to a listing display component 140 and presented to the user.

The listing display component 140 can present them to the user in different views. For example, the listings may be presented in a list format with or without corresponding images of the item. Alternatively or in addition, each of the listings can also be presented in a map related view. For instance, imagine that the user locates a number of Queen Anne beds for sale within 25 miles of his/her home. In addition to viewing images of each bed, the user can also view the exact or approximate locations of each bed. This information can be helpful to him/her when deciding which bed to purchase. The same quality bed at the same price that is located 5 miles from him/her versus 20 miles may seem more desirable to him/her.) Even better, the map function of the listing display component 140 can also provide the user with driving directions. Moreover, the system 100 can dynamically display one or more listings that correspond to items for sale, events, personal ads, resumes, want ads, and item giveaways as a function of search terms, geo-tags associated with the listing, and a trust categorization (or level) associated with the listing and the user.

Figure 2:
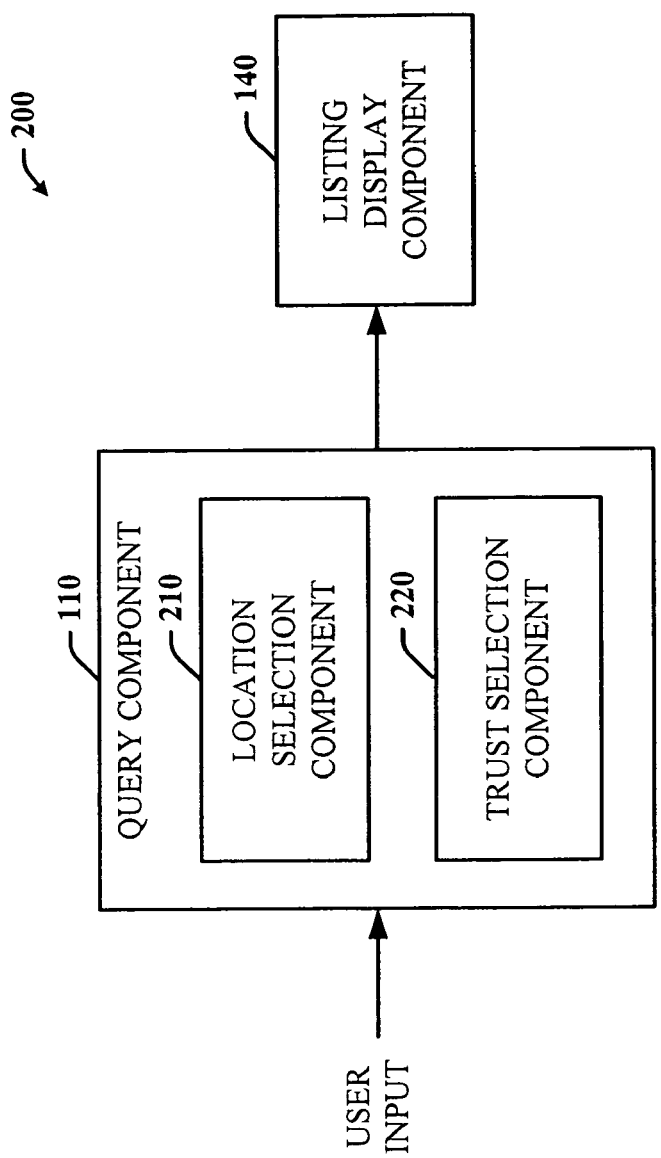
FIG. 2 is a block diagram of a query system for a listing service that involves advanced filtering components which improve search results returned and provides a variety of filtered views for the user.

Referring now to FIG. 2, there is a block diagram of a query system 200 for a listing service that involves advanced filtering components which improve search results returned and provides a variety of filtered views for the user. The system 200 includes a query component 110 that can receive and process a user's query. The query component 110 can include one or more filtering components such as a location selection component 210 and a trust selection component 220. The location selection component 210 and trust selection component 220 can effectively modify a list of listings retrieved by the query component 110 by selecting listings that satisfy the search terms as well as location and trust factors. Put another way, any retrieved listings can be dynamically displayed as a function of the search terms, the desired geographic location associated with the listing, and the trust levels associated with the user (searcher) and the listing.

For example, a user may perform a search on white pure bred Standard Poodle puppies. However, to further enhance the search, the user can also input the desired location of the puppies to limit the distance from his/her location. Because the user is aware that not all breeders are alike, she chooses to look for puppies bred by someone in his/her online dog club community. Thus, the user has an implicit trust relationship with the members of the online dog club community compared to any other breeder or entity in the general public. Any available listings can be displayed to the user via the listing display component 140.

Furthermore, the user can always expand his/her search beyond this community or even beyond his/her current location parameters at a later time by adjusting such parameters. For instance, suppose the user adjusts the location parameter by increasing the distance to 40 miles from his/her location (or a 40 mile radius of his/her location), the listings displayed to the user can dynamically change without re-running the query. This is because the search terms result in a number of listings returned; however, the filtering components filter the returned listings and cause filtered views of the listings to be displayed to the user. It should be appreciated that the query can be re-run as determined by the query system that is employed by the user.

Figure 3:
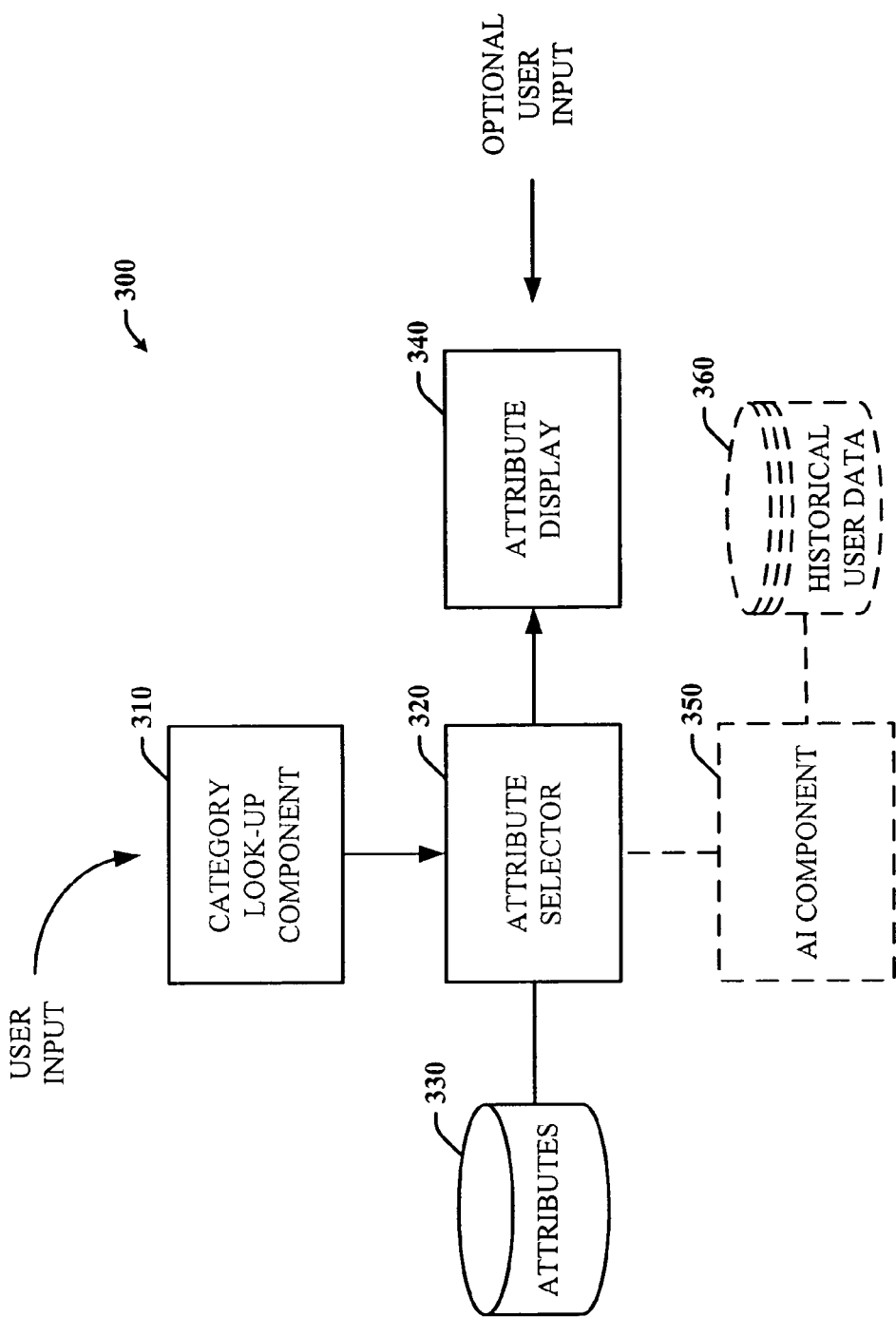
FIG. 3 is a block diagram of a filtering system for a listing service that facilitates providing various filtered views for a user based in part on the user's input.

Referring now to FIG. 3, there is a block diagram of a filtering system 300 for a listing service that facilitates providing various filtered views for a user based in part on the user's input. The system 300 includes a category look-up component 310 that receives user input such as one or more search terms and determines a category of listings from which to search. The determined category can be communicated to an attribute selector 320. The attribute selector 320 can select one or more attribute types 330 to present to the user (via an attribute display 340) based at least in part on the particular category. For example, a house category may have attribute types such as number of bedrooms, number of bathrooms, total square footage, number of floors, number of garages, garage type, structure material, number of fireplaces, style, etc., whereas a car category may have attribute types such as color, number of doors, engine type, year, model, make, and the like. The user can provide additional input for these attribute types or an AI component 350 can automatically fill this information in for the user based on the user's historical data 360, previous searches, or search preferences.

In practice for instance, imagine that Simon has performed a multitude of home searches and has consistently looked for 4 bedroom-3 bathroom homes. Simon is searching again and to save him time, the attributes for his bedroom and bathroom preferences are filled in automatically. The other attributes may be far less important to him and hence, he may leave them blank. Alternatively, he may fill them in but the AI component 350 may be trained to weigh some of the attributes lower than others. Thus, Simon's input as to number of fireplaces may be considered in the search but any matches to his bedroom-bathroom preferences may override his indicated number of fireplaces.

In general, the AI component 350 can be trained on explicit as well as implicit information. In particular, the AI component 350 can be trained on the listings that Simon has previously viewed (e.g., shown an interest). Thus, if many of those listings were for 3500 square foot two-story homes, then these attributes may be filled or pre-filled accordingly to facilitate providing the user with the most relevant and desired listings.

The following several figures depict exemplary user interfaces that may be used in connection with a filtering system for a listing service as previously described. It should be appreciated that these are merely illustrative of the functionalities involved and that other variations of the screen layout and presentation of the user interface may differ according to user or program preferences or according to the device on which such is displayed.

Figure 4:
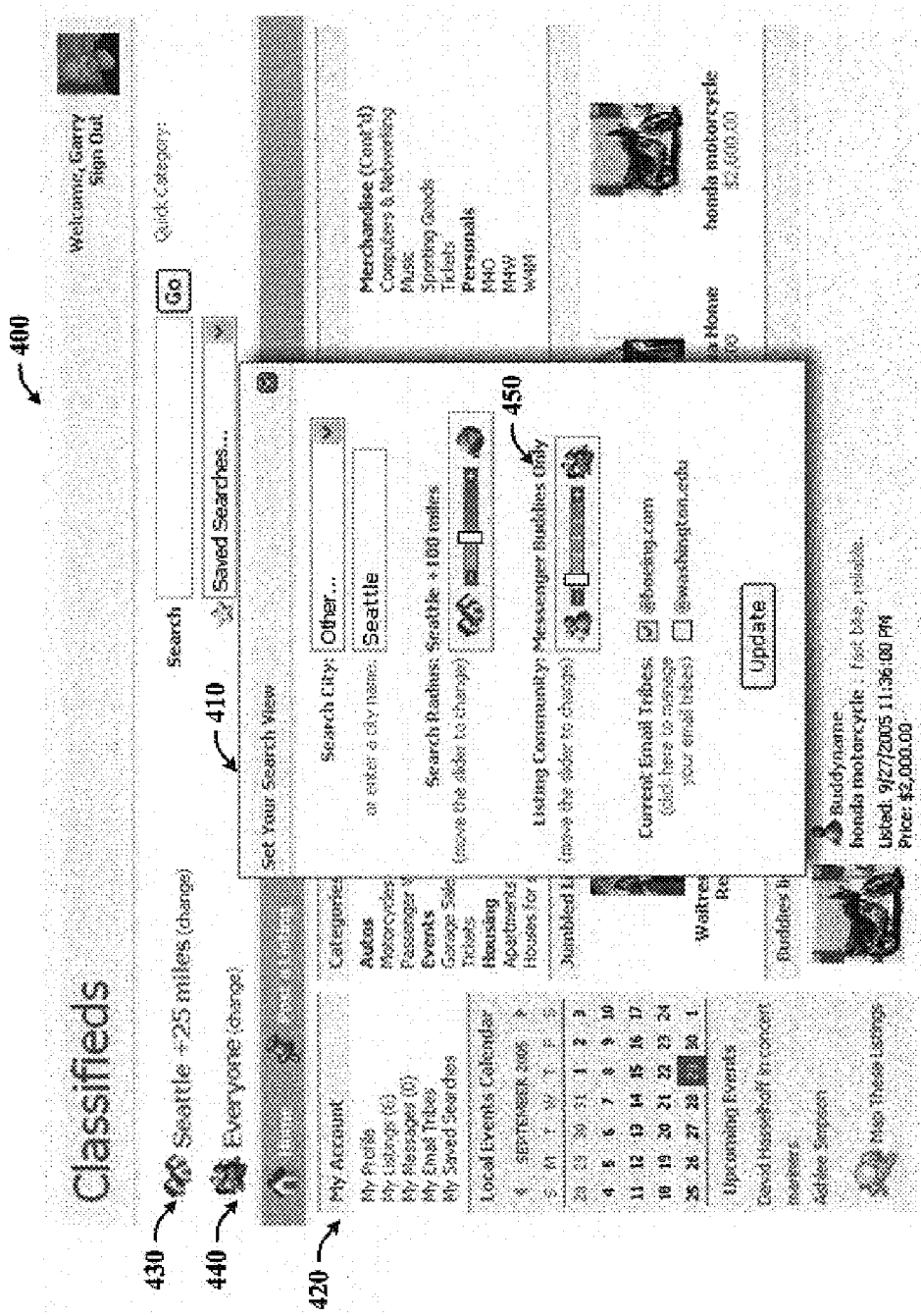
FIG. 4 is an exemplary user interface of a search view screen that allows a user to set a plurality of search parameters or attributes to obtain and display the desired search results.

Beginning with FIG. 4, there is an exemplary user interface of a main search page 400 for the listing service and search view menu 410 that allows a user to set a plurality of search parameters or attributes to obtain and display the desired search results. The main search page 400 can include a plurality of information as desired by the user. For instance, the user can access his/her account 420 that may include but is not limited to the user profile, messages, email tribe memberships and saved searches.

The user can also manage his/her listings in the account section. Though not shown in the figure, the user can employ one or more filtering components to track his current listings in terms of performance, number of bids, number of inquiries, location of inquiring users, and the like as well as track or manage his sold inventory, for example. By doing so, the user can visualize sale trends, hotspots of interest for his goods or services, and demographics of previous buyers, all of which can facilitate future sales for the user. For example, a seller can use one or more filters to optimize his/her buying audience and exposure to potential buyers by viewing sold or current inventory based on location of demand or interest. If there seems to be a greater demand for bicycles within 10 miles of the local university, the seller may decide to move his/her inventory closer to the university or offer greater discounts or free delivery to university students (e.g., as indicated by their domain or email group).

In addition to manually entered searches, the user can also have one or more standing searches. Such searches can be periodically or continuously run in such a way that the listing service may be constantly monitored for the desired listing. For example, suppose the user is currently interested in Babe Ruth memorabilia but does not have the time to look for its availability. Instead of manually performing this search daily, weekly, or even hourly, the system can be programmed to automatically perform the search. Thus, the user's main search page 400 can also list these standing searches and include the number of new or total listings retrieved on a particular day, for instance, or for all time.

Figure 5:
FIG. 5 is an exemplary user interface of a search view screen that allows a user to set a plurality of search parameters or attributes to obtain and display the desired search results.
Figure 6:
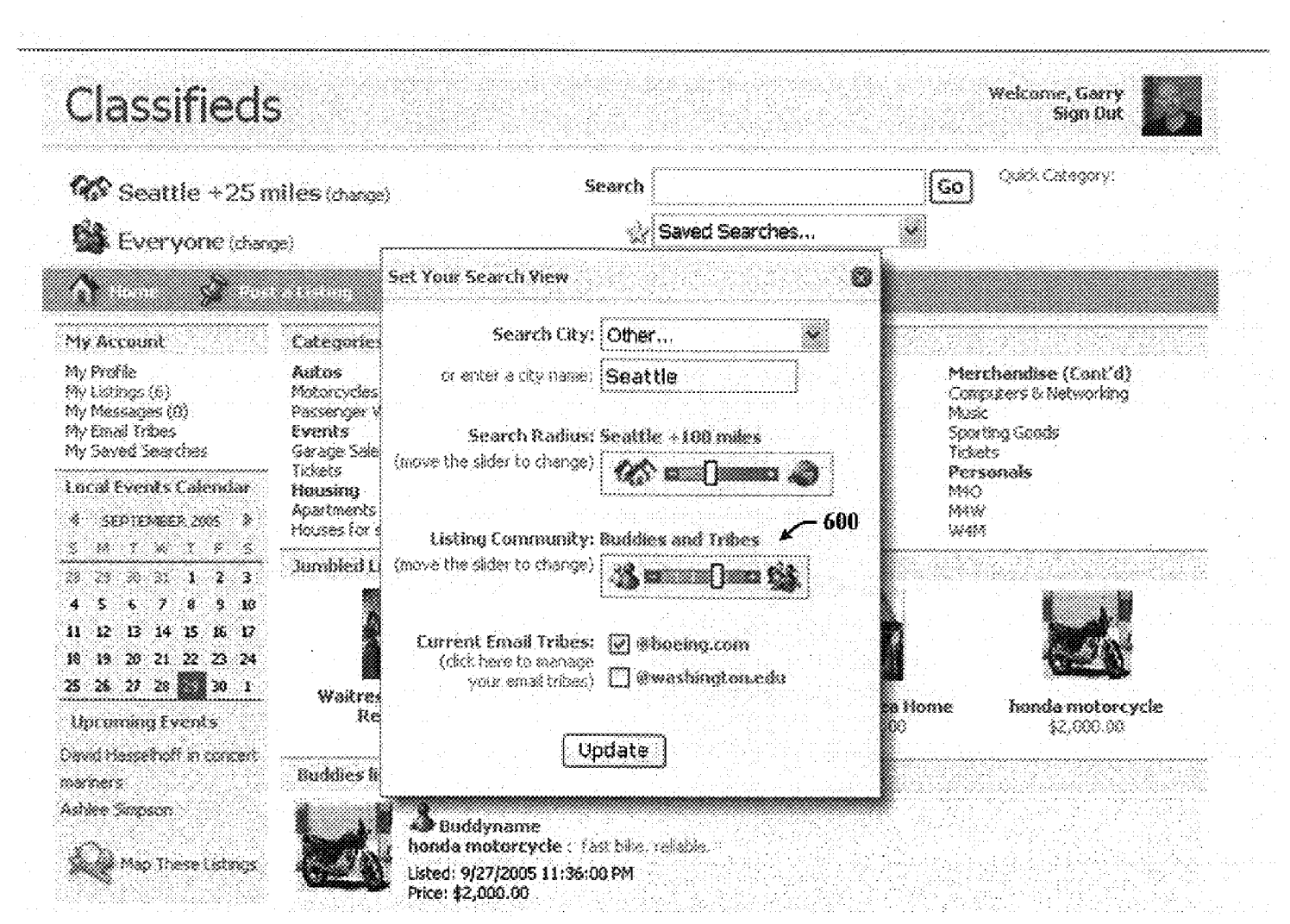

Furthermore, the main search page 400 can include some of the user's current location 430 and trust 440 parameters that can be applied to any particular search. As shown in the figure, the user, Garry, would like to search anyone or everyone's listings where the location associated with the listing (or the listed item) is within 25 miles of Seattle. Hence, for any specific search such as for a computer or a hockey stick, everyone's listing (e.g., or item in the listing) that is located in Seattle or within 25 miles thereof and that satisfies the other search terms may be retrieved and shown to Garry. These parameters can be changed by accessing the search view menu 410. The search view menu can include one or more navigational components that can adjust the user's desired search location and trusted listing communities. In particular, Garry can search only his messaging contacts as indicated by the slider control 450 in FIG. 4. Alternatively, he may want to only search his email contacts 500 as indicated in FIG. 5. To further expand the searchable listings, Garry may ultimately decide to search his messaging and email contacts (600) as depicted in FIG. 6.

The display in FIG. 4 also includes a list of categories that Garry may manually select before entering search terms to limit his search to the particular category. However, the category may be selected by the listing service once Garry enters a search request. In either case, the selected category can be displayed to Garry so that Garry can nearly always if not always maintain some perspective as to where he is searching. For example, suppose that Garry enters a search for "bats". If the search results include listings related to bats (e.g., animal) instead of Garry's intended baseball bats, Garry may notice that the category of the search was animals instead of sports.

Figure 7:
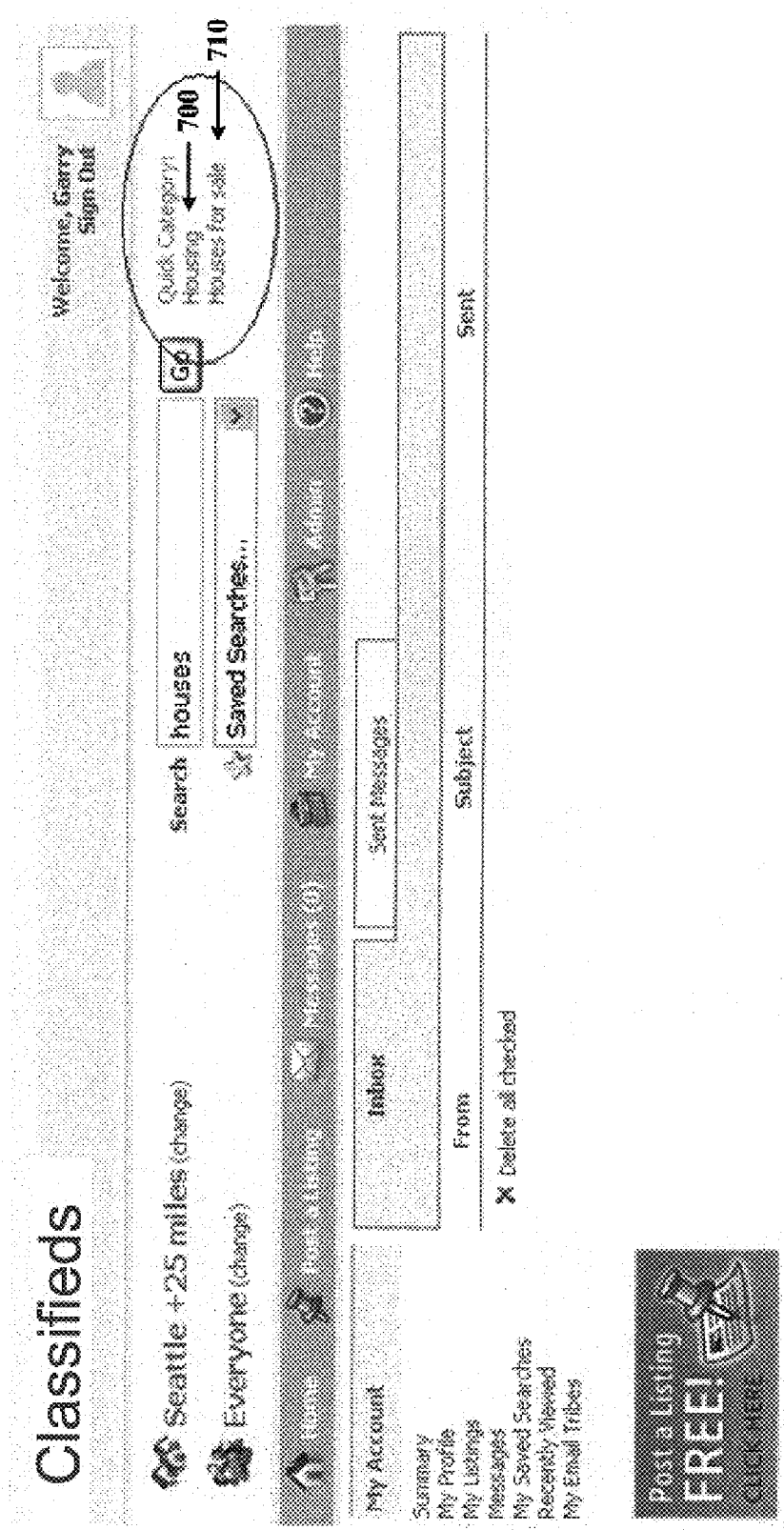
FIG. 7 is an exemplary user interface of a secondary search screen that allows a user to set a plurality of search parameters or attributes to obtain and display the desired search results.

Subcategories are also possible as shown in FIG. 7. As can be seen, FIG. 7 indicates a main category 700 called "housing" and beneath it, a subcategory 710 called "houses for sale". Other subcategories for the category Housing may include houses for rent, apartments, condominiums, vacation rentals, pet houses, play houses, etc.

Figure 8:
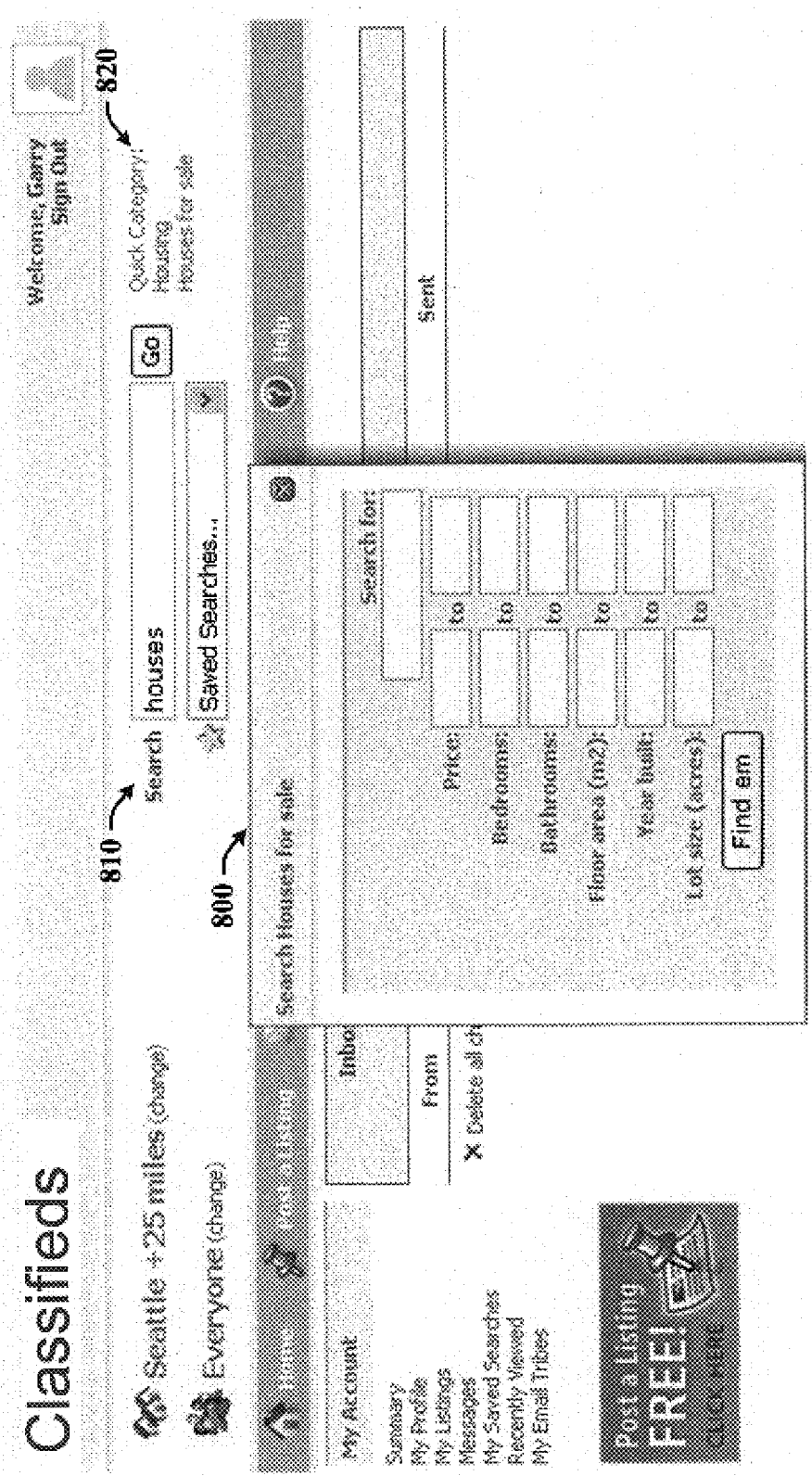
FIG. 8 is an exemplary user interface of an attribute input screen that allows a user to set a plurality of search attributes (e.g., for a home search) to obtain and display the desired search results.
Figure 9:
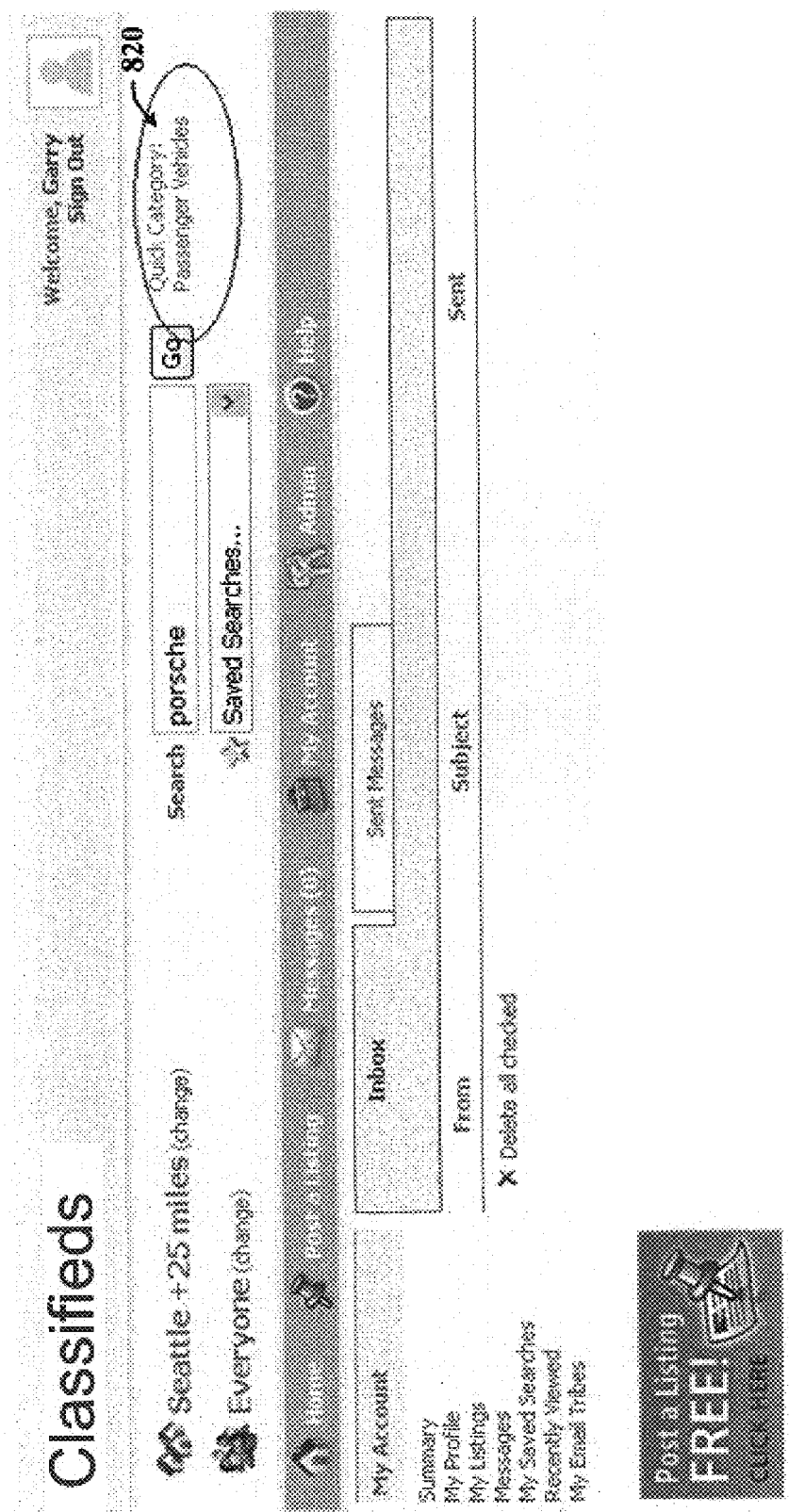
FIG. 9 is an exemplary user interface of a search view screen that allows a user to set a plurality of search parameters or attributes to obtain and display the desired search results.
Figure 10:
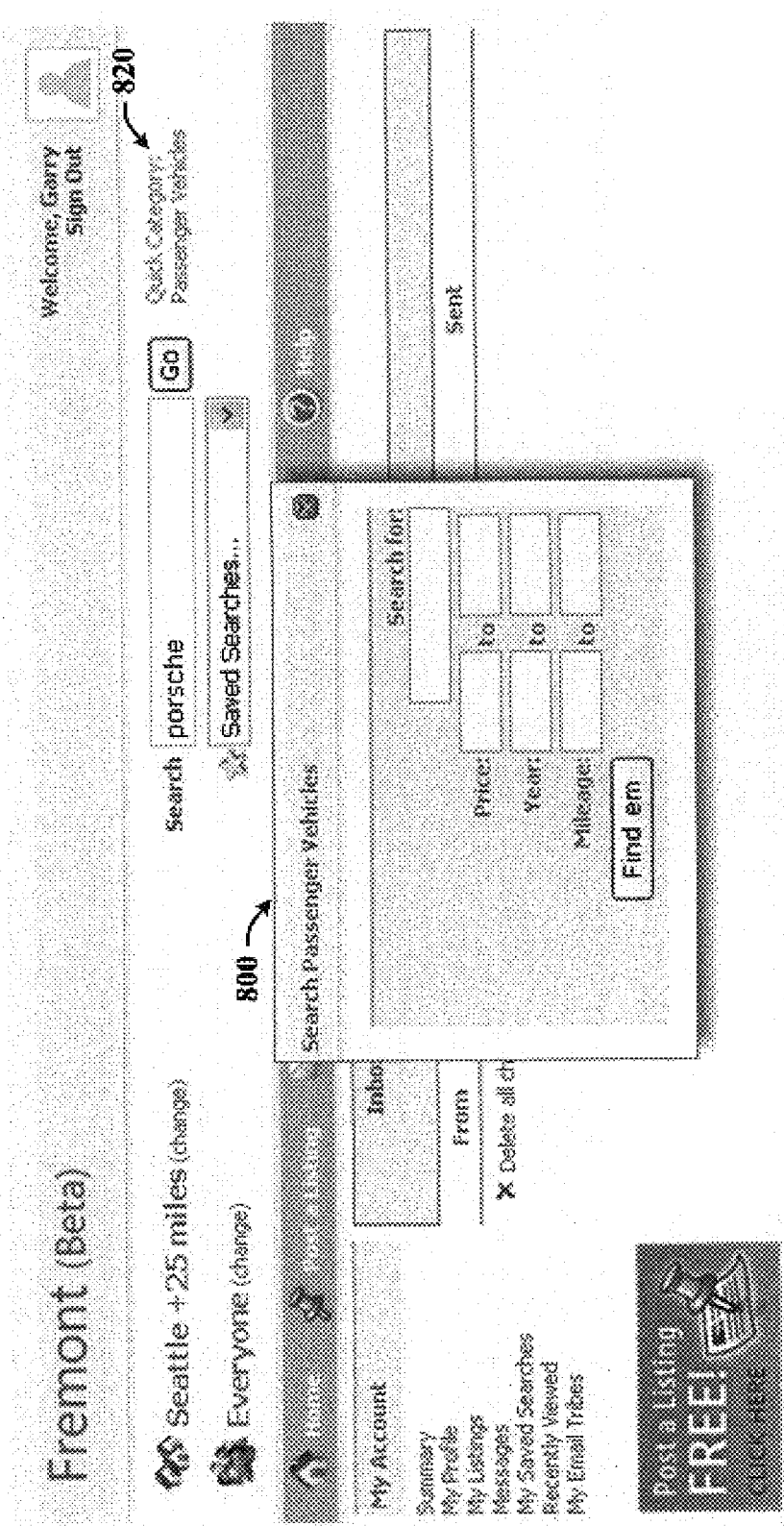
FIG. 10 is an exemplary user interface of an attribute input screen that allows a user to set a plurality of search attributes (e.g., for a passenger vehicle search) to obtain and display the desired search results.

Turning now to FIG. 8, there is an exemplary user interface of an attribute input screen 800 that allows a user to set a plurality of search attributes in addition to any search terms entered in a search field 810 to obtain and display the desired search results. The attribute input screen 800 can include one or more attribute types related to the particular category 820: Housing in FIG. 8 and Passenger vehicles in FIG. 9. For example, when searching for homes for sale, the user can employ additional search criteria specific to homes such as year built, bedrooms, bathrooms, and lot size. However, when searching for passenger vehicles, a different set of attributes may appear as demonstrated in FIG. 10. Here, the attributes may be price, year, and mileage. Other search terms can be entered as well at the user's discretion to further filter the listings ultimately displayed to the user.

Various methodologies will now be described via a series of acts. It is to be understood and appreciated that the subject system and/or methodology is not limited by the order of acts, as some acts may, in accordance with the subject application, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject application.

Figure 11:
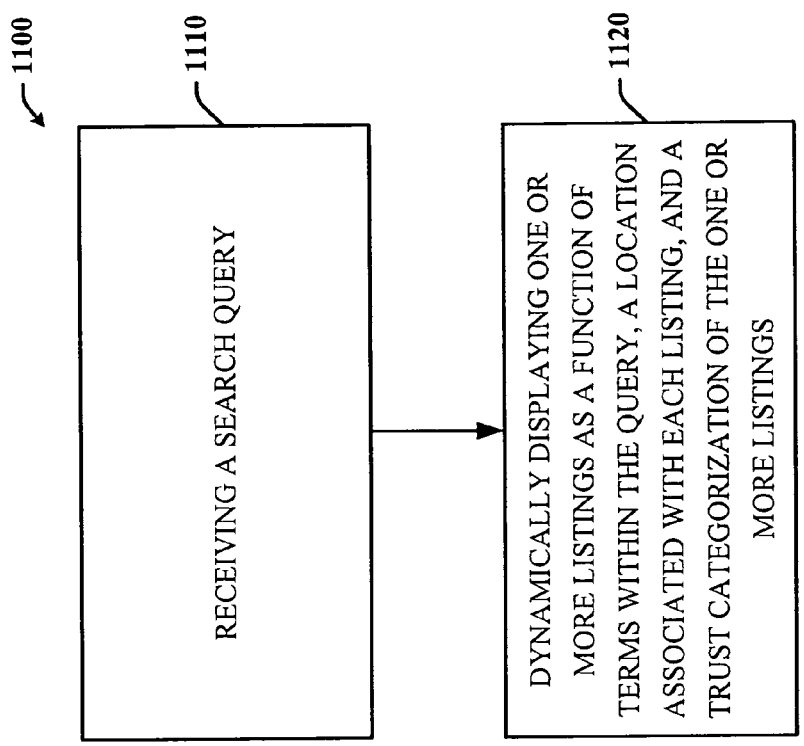
FIG. 11 is a flow chart illustrating an exemplary filtering methodology that facilitates using a listing service to search for a desired item.

Referring now to FIG. 11, there is a flow diagram of an exemplary method 1100 that facilitates displaying listings in response to a search query in connection with an online listing service. The method 1100 involves receiving a search query at 1110. The search query may include a number of variables such as search terms, location related information such as a preferred location associated with the listing, and trust-based information associated with the listing (e.g., listing owner). The search terms may change from one thing to another (e.g., antique chair to crystal glassware) but the location and trust information can be selected once, for example, and then applied to one or more searches. At 1120, one or more listings can be dynamically displayed as a function of the search terms, the location or geo-tag information associated with each listing, and the trust-based information associated with the listing. The list of listings can automatically change when the user adjusts the location or trust parameters, for instance. In addition, other selected attributes may affect which listings are shown to the user. Hence, such attributes can also provide different filtered views of the listings. Alternatively, the search query can be re-run when any one of the attributes or view parameters (e.g., location, trust, etc.) is changed.

Figure 12:
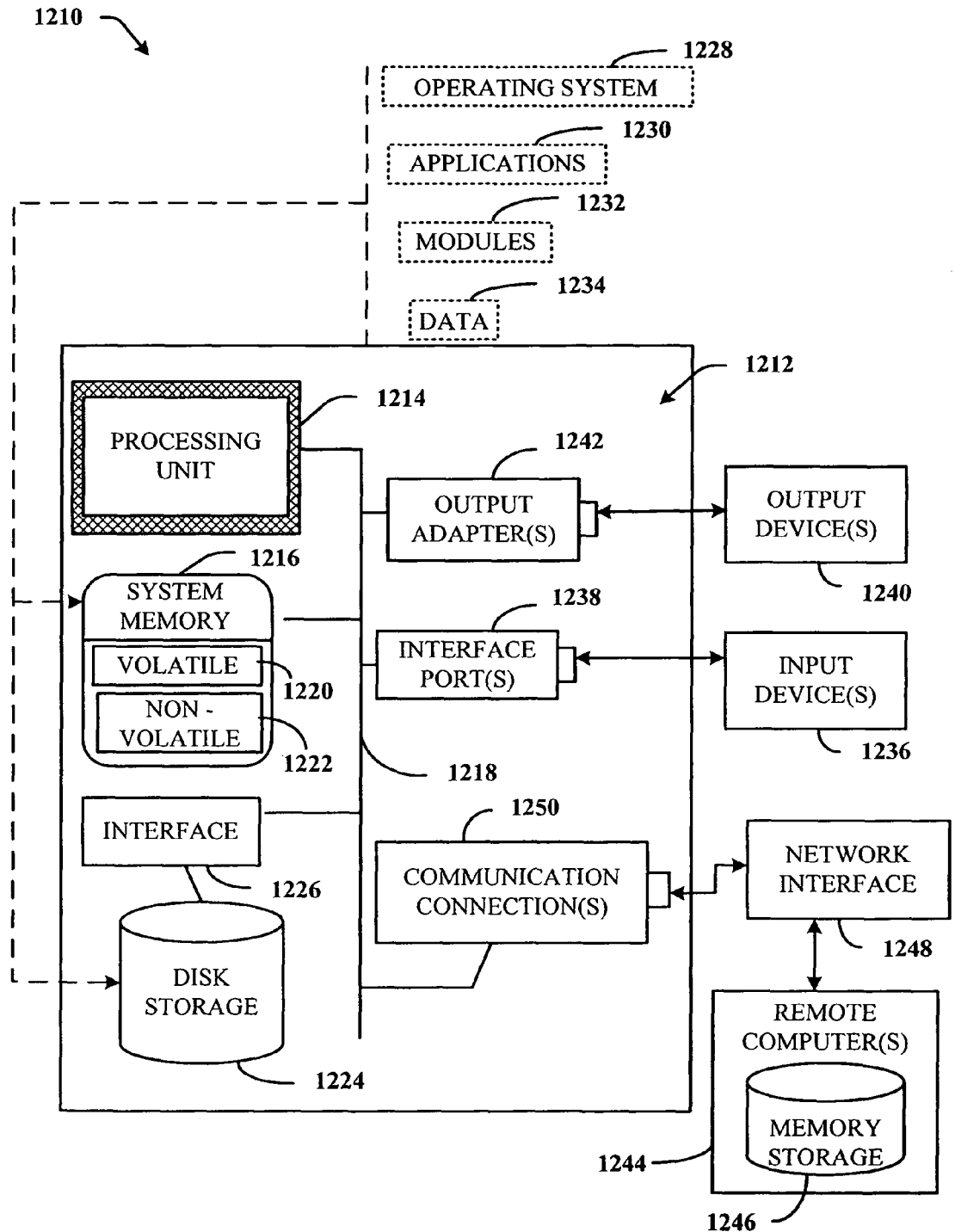
FIG. 12 illustrates an exemplary environment for implementing various aspects of the invention.

In order to provide additional context for various aspects of the subject application, FIG. 12 and the following discussion are intended to provide a brief, general description of a suitable operating environment 1210 in which various aspects of the subject application may be implemented. While the system(s) and/or method(s) is described in the general context of computer-executable instructions, such as program modules, executed by one or more computers or other devices, those skilled in the art will recognize that the invention can also be implemented in combination with other program modules and/or as a combination of hardware and software.

Generally, however, program modules include routines, programs, objects, components, data structures, etc. that perform particular tasks or implement particular data types. The operating environment 1210 is only one example of a suitable operating environment and is not intended to suggest any limitation as to the scope of use or functionality of the system and/or method. Other well known computer systems, environments, and/or configurations that may be suitable for use with the system and/or method include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 12, an exemplary environment 1210 for implementing various aspects of the system and/or method includes a computer 1212. The computer 1212 includes a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MCA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable ROM (EEPROM), or flash memory. Volatile memory 1220 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1212 also includes removable/nonremovable, volatile/nonvolatile computer storage media. FIG. 12 illustrates, for example a disk storage 1224. Disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used such as interface 1226.

It is to be appreciated that FIG. 12 describes software that acts as an intermediary between users and the basic computer resources described in suitable operating environment 1210. Such software includes an operating system 1228. Operating system 1228, which can be stored on disk storage 1224, acts to control and allocate resources of the computer system 1212. System applications 1230 take advantage of the management of resources by operating system 1228 through program modules 1232 and program data 1234 stored either in system memory 1216 or on disk storage 1224. It is to be appreciated that the subject system and/or method can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212 and to output information from computer 1212 to an output device 1240. Output adapter 1242 is provided to illustrate that there are some output devices 1240 like monitors, speakers, and printers among other output devices 1240 that require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems and DSL modems, ISDN adapters, and Ethernet cards.

What has been described above includes examples of the subject system and/or method. It is, of course, not possible to describe every conceivable combination of components or methodologies for purposes of describing the subject system and/or method, but one of ordinary skill in the art may recognize that many further combinations and permutations of the subject system and/or method are possible. Accordingly, the subject system and/or method are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A machine-implemented filtering system for an online listing service that facilitates searching for and selectively displaying items comprising:
   a processor that facilitates searching for and selectively displaying items;
   a query component that receives a search query associated with a user; wherein the search query comprises user-based search terms, a location and distance radius parameter, and a trust parameter; and
   an analysis component that parses the search query and filters a plurality of listings to converge on a set of listings that satisfy the search query;
   a listing display component that dynamically displays one or more listings respectively associated with one or more listing entities based at least in part on search terms within the search query, wherein a geographic location is respectively associated with each of the one or more listings, and wherein a trust categorization is respectively associated with the each of the one or more listings, wherein the trust categorization comprises a trusted listing entity that has a trust relationship with the user and a listing entity that does not have the trust relationship with the user, wherein the trusted listing entity is a listing entity of the one or more listing entities that is determined to be the trusted listing entity based at least in part on belonging to at least one online community to which the user belongs, and a listing entity that does not have a trust relationship with the user is another listing entity of the one or more listing entities that is determined to not have a trust relationship with the user based at least in part on not belonging to the at least one online community to which the user belongs, and wherein each listing of the one or more listings is displayed based upon the trust categorization associated with each listing or each listing associated with a listing entity that does not have a trust relationship with the user is omitted from the one or more listings when the one or more listings is displayed.

2. The system of claim 1, wherein the query component further comprises a category look-up component that limits a scope of the search terms within the search query.

3. The system of claim 2, wherein the search query further comprises one or more attribute types which are selected to display based at least in part on one or more of the search terms.

4. The system of claim 1, further comprising:
an AI component that is trained to automatically provide at least one of the following based on historical user data: search terms, attribute terms, or parameter terms.

5. The system of claim 1, wherein the search query comprises a standing search that is performed periodically in an automated manner to mitigate repeated user input of the search query.

6. The system of claim 1, further comprising:
a mapping component that provides one or more map related views of the one or more listings displayed by the listing display component.

7. The system of claim 1, further comprising:
a user identification component that receives user data, wherein the user data comprises login information, username, and user profile information to facilitate determining a user's trust associations.

8. The system of claim 1, wherein the location associated with each of the one or more listings comprises a geographic reference to at least one of a source of the listing or an item in the listing.

9. Computer-storage media having computer-usable instructions embodied thereon that, when executed, perform to be executed to perform a filtering method for a listing service that facilitates performing searches, the method comprising:
presenting to a user a group of search attributes that includes location, delivery mode, price, trusted seller, social group, and features;
receiving a search query associated with a user, wherein the search query includes at least one selected search attribute that was selected from the group by the user; wherein the search query comprises user-based search terms, a location and distance radius parameter, and a trust parameter;
parsing the search query and filters a plurality of listings to converge on a set of listings that satisfy the search query;
receiving a subset of listings in response to the search query, wherein the subset of listings is filtered based on at least an identity of the user, the at least one selected search attribute, and an at least one inferred search attribute;
determining whether the user and a listing entity belong to a same online community for each listing entity associated with a listing in the subset of listings;
determining that at least one listing entity is a trusted listing entity when the at least one listing entity belongs to the same online community as the user;
determining that at least one other listing entity is not trusted when the at least one other listing entity does not belong to the same online community as the user;
dynamically displaying one or more listings of the subset of listings as a function of search terms within the search query, wherein a geographic location is associated with each listing of the subset of listings, and wherein a trust categorization is respectively associated with each listing of the subset of listings, wherein the trust categorization for each listing of the subset of listings is determined based at least in part on whether a listing entity is the trusted listing entity or is not the trusted listing entity, wherein each listing of the subset of listings is displayed based upon the trust categorization associated with each listing or each listing associated with a listing entity that is not a trusted listing entity is omitted from the one or more listings when the one or more listings is displayed.

10. The media of claim 9, wherein the method further comprises:
employing a respective geo-tag to tag each listing of the subset of listings with a respective geographic location reference, wherein the geo-tag is analyzed during the search query to facilitate determining whether a particular listing satisfies the geographic location associated with the search query.

11. The media of claim 9, wherein the method further comprises:
employing a trust selection component and applying it across a plurality of queries.

12. The media of claim 11, wherein the method further comprises:
automatically determining one or more attributes to be utilized to focus the search query based in part on previous selected attributes associated with a user and a type of search query received.

13. The media of claim 9, wherein the method further comprises:
dynamically recommending at least one additional search-query term to a user to use in the search query based in part on at least one received search-query term to facilitate focusing the search query.

14. The media of claim 9, wherein the method further comprises:
mapping the subset of listings to facilitate providing a geographic perspective of the subset of listings in relation to a user or to any other listings.

15. The media of claim 9, wherein the method further comprises:
repeatedly running the search query in a periodic manner to facilitate mitigating repetitive input of the search query by a user; and
alerting the user regarding one or more listings of potential interest to the user in response to the search query.

16. The media of claim 9, wherein the method further comprises:

adjusting at least one of the location or the trust categorization to modify a filtered view of the one or more listings without rerunning the search query.

17. The media of claim 9, wherein the method further comprises:

augmenting one or more search terms by adding one or more attributes in the search query, wherein the one or more attributes are determined by one or more of the search terms.

18. A machine-implemented filtering system for an online listing service that facilitates searching for and selectively displaying items comprising:

a processor that facilitates searching for and selectively displaying items;

means for receiving a search query associated with a user; wherein the search query comprises user-based search terms, a location and distance radius parameter, and a trust parameter; and means for parsing the search query and filters a plurality of listings to converge on a set of listings that satisfy the search query;

means for dynamically displaying one or more listings respectively associated with one or more listing entities as a function of search terms within the search query, wherein a location is respectively associated with each of the one or more listings, and wherein a trust categorization is respectively associated with the each of the one or more listings, wherein the trust categorization for each listing of the one or more listings is determined based in part on a type of relationship between the user and a listing entity associated with a respective listing of the one or more listings, wherein the type of relationship comprises a trusted listing entity that is a listing entity of the one or more listing entities determined to be the trusted listing entity based at least in part on belonging to at least one online community to which the user belongs and a listing entity that is not trusted that is another listing entity of the one or more listing-entities that is determined to be not trusted based at least in part on not belonging to the at least one online community to which the user belongs, wherein each listing of the one or more listings is displayed based upon the trust categorization associated with each listing or each listing associated with a listing entity that is not trusted is omitted from the one or more listings when the one or more listings is displayed.

* * * * *

UNITED STATES PATENT AND TRADEMARK OFFICE
CERTIFICATE OF CORRECTION

PATENT NO.         : 7,725,477 B2                                    Page 1 of 1
APPLICATION NO.    : 11/311813
DATED              : May 25, 2010
INVENTOR(S)        : Garry R. Wiseman It is certified that error appears in the above-identified patent and that said Letters Patent is hereby corrected as shown below:

In column 11, line 53, in Claim 9, after "instructions" delete "embodied thereon that, when executed, perform".

In column 12, line 42, in Claim 12, delete "11" and insert -- 9 --, therefor.

Signed and Sealed this
Seventeenth Day of May, 2011

David J. Kappos
*Director of the United States Patent and Trademark Office*